Sept. 23, 1941.  R. N. JANEWAY  2,256,978
RAILWAY VEHICLE
Original Filed Oct. 1, 1938
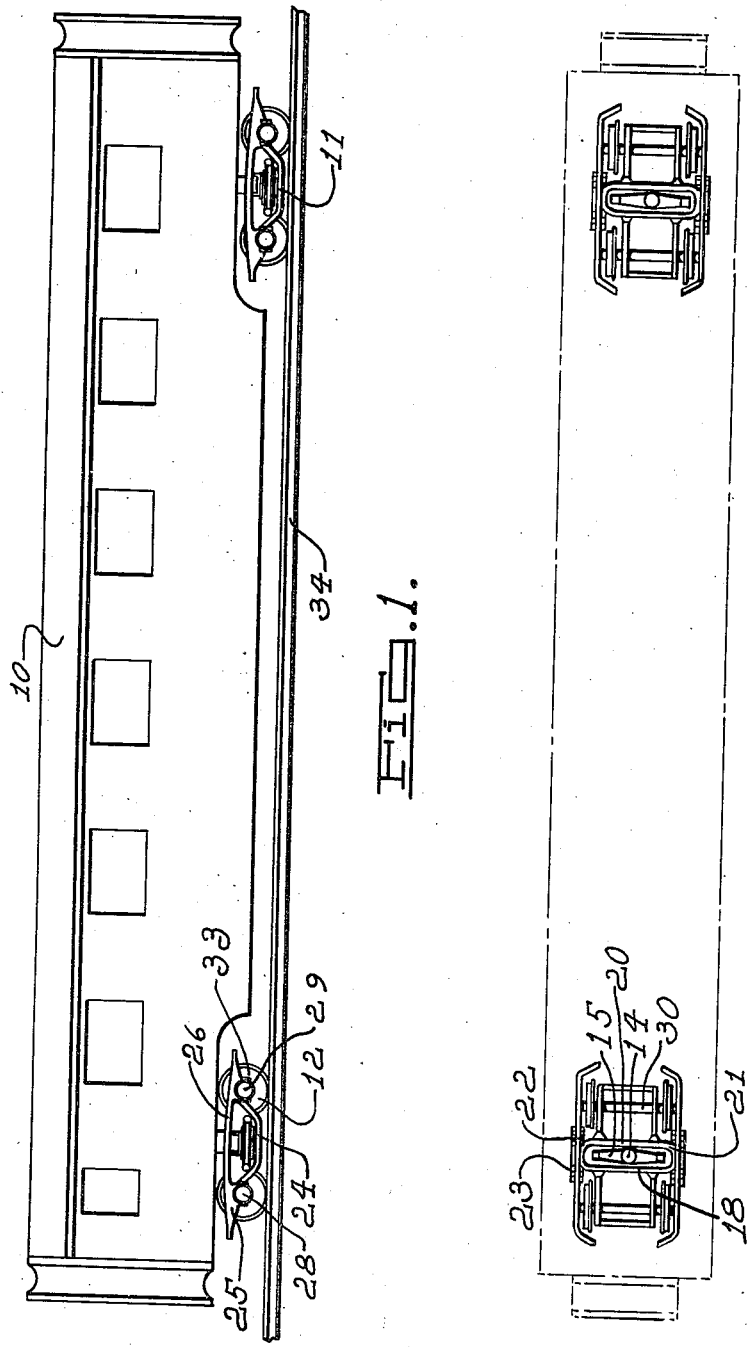
INVENTOR
ROBERT N. JANEWAY
BY
Harness, Lind, Pater & Harris
ATTORNEYS.

Patented Sept. 23, 1941

2,256,978

UNITED STATES PATENT OFFICE 2,256,978

RAILWAY VEHICLE

Robert N. Janeway, Detroit, Mich., assignor to Chrysler Corporation, Highland Park, Mich., a corporation of Delaware Original application October 1, 1938, Serial No. 232,756. Divided and this application December 5, 1939, Serial No. 307,661

2 Claims. (Cl. 105—197)

My invention relates to railway vehicles and it has particular relation to the construction of railway vehicle trucks.

The object of my invention consists in providing a particular arrangement of springs whereby synchronism of movement between the two ends of the car body is prevented.

This application is a division of my application for patent, Serial No. 232,756, filed October 1, 1938.

For a better understanding of my invention reference may now be had to the accompanying drawing, in which:

Fig. 1 is a side elevational view of a railway car embodying my invention.

Fig. 2 is a plan view of the car illustrated in Fig. 1, the car body being shown in dot and dash lines in the interest of clearness.

In the structure illustrated a car body 10 is supported adjacent each end upon a front truck 11 and a rear truck 12, the car body having car body bolsters which are provided with center bearing members which fit within and rest upon a center bearing member 14 of each truck. The center bearing 14 rests upon a truck bolster 15 which extends laterally centrally of the truck. Each end of the bolster 15 is supported by swing links (not shown) on a truck frame 18 comprising two spaced relatively heavy transversely extending members 20, generally known as transoms, the ends of which are connected together by means of an arcuate rigid end portion 21. The transom members 20, through the agency of the arcuate end member 21, which projects laterally beyond the ends of the transom members proper, rest upon a pair of elliptical leaf springs 22 and 23. The lower portion of the springs 22 and 23 rest upon a lower portion 24 of a side frame member 25. The side frame member 25 is provided with an upper portion 26, which is spaced from the lower portion 24, throughout the major portion of its length, but the two portions are integral, being united at the ends of the side members, and provide openings 28 for the reception of bearing housings 29 which enclose and support axles 30 and transmit thereto the load carried thereby. Mounted on the axles 30 are wheels 33 adapted to roll upon rails 34 of the usual railroad rail type.

From the foregoing description it will be apparent that all the weight of the car body and all the weight of the truck with the exception of the side frame members, the wheels and the axles, rests upon the springs 22 and 23 and there are no springs disposed in the weight supporting chain between springs 22 and 23 and the car body, thus eliminating the creation of a relatively heavy mass of material mounted between two sets of springs, as is customary on most passenger car trucks, and which is conducive to the transmission of secondary vibrations to the car body from this independently sprung mass. It will also be apparent that the larger part of the weight of the truck constitutes a portion of the sprung mass, thus minimizing the unsprung portion thereof.

It has been my experience that if the springs 22 and 23 of the trucks 11 and 12 are identical in stiffness and in the load normally supported thereby, or if the loads differ and the stiffness is proportional to the loads, so that their natural period of vibration is the same, there is a probability of a synchronism of movement developing in the two ends of the car, which necessarily constitutes a rigid body connecting the two springing mechanisms, which may build up to uncomfortable or undesirable proportions. As springs of this character may be secured of various degrees of stiffness I have found it desirable to employ in the trucks 11 and 12 springs which bear a slightly different relation to the load supported thereby so that the static deflection thereof will differ at least ten per cent, but preferably more, so as to prevent the development of synchronized movement between the two ends of the car which difference produces natural rates of vibration sufficiently different that any movement of one end of the car tends to interfere with and break up any regular movement of the other end of the car, thus preventing synchronism of movement between the two ends of the car which I have found to be undesirable. I have found that a difference in natural period of vibration between the ends of five per cent or more will accomplish this object.

Although I have illustrated but a single form of my invention and have described in detail but a single application thereof it will be apparent to those skilled in the art that it is not so limited but that various modifications and changes may be made therein without departing from the spirit of my invention or from the scope of the appended claims.

I claim:

1. In a railway vehicle, a car body having substantially similar weight distribution at both ends, a plurality of trucks each provided with a plurality of springs adapted to jointly support said car body, the springs of each truck being substantially uniform in static deflection and differing in static deflection from the springs of the remainder of the trucks supporting the same car body at least ten per cent.

2. In a railway vehicle, a car body of substantially uniform weight distribution, a truck supporting each end of said car body, each of said trucks being adapted to support equal loads and provided with springs adapted to support a portion of said truck and one end of said car body, said springs being of such rigidity with respect to the load thereon as to produce a natural period of oscillation of one end of said car body differing from the natural period of oscillation of the other end of said car body by at least five per cent.

ROBERT N. JANEWAY.